US009711781B2

(12) United States Patent
Seo et al.

(10) Patent No.: US 9,711,781 B2
(45) Date of Patent: Jul. 18, 2017

(54) APPARATUS FOR PREVENTING BATTERY OVERCHARGE

(71) Applicant: Hyundai Motor Company, Seoul (KR)

(72) Inventors: Jeong Hun Seo, Gyeonggi-do (KR);
Yong Jin Lee, Gyeonggi-do (KR);
Yeon Man Jeong, Gyeonggi-do (KR);
Hae Kyu Lim, Gyeonggi-do (KR); Dal Kim, Gyeonggi-do (KR); Jun Seok Choi, Gyeonggi-do (KR); Yoon Cheol Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 14/332,754

(22) Filed: Jul. 16, 2014

(65) Prior Publication Data

US 2015/0171480 A1 Jun. 18, 2015

(30) Foreign Application Priority Data

Dec. 18, 2013 (KR) .......................... 10-2013-0157912

(51) Int. Cl.
*H01M 2/02* (2006.01)
*H01M 10/42* (2006.01)
*H01M 2/34* (2006.01)
*H01M 2/10* (2006.01)

(52) U.S. Cl.
CPC ......... *H01M 2/345* (2013.01); *H01M 2/1077* (2013.01); *H01M 2200/20* (2013.01); *H01M 2220/20* (2013.01)

(58) Field of Classification Search
CPC ............... H01M 10/42; H01M 2/0245; H01M 2220/20; H01M 2200/20
See application file for complete search history.

(56) References Cited

U.S. PATENT DOCUMENTS

| 2006/0267545 | A1* | 11/2006 | Lee ..................... | H01M 2/1061 |
| | | | | 320/106 |
| 2012/0040222 | A1* | 2/2012 | Quick ................. | H01M 10/647 |
| | | | | 429/120 |
| 2012/0058382 | A1* | 3/2012 | Carignan ............. | B60L 3/0007 |
| | | | | 429/158 |
| 2013/0075242 | A1* | 3/2013 | Lim ........................ | H01M 2/34 |
| | | | | 200/52 R |

FOREIGN PATENT DOCUMENTS

| JP | 11-265704 A | 9/1999 |
| JP | 2006260990 A | 9/2006 |

(Continued)

*Primary Examiner* — Muhammad Siddiquee
(74) *Attorney, Agent, or Firm* — Mintz Levin Cohn Ferris Glovsky and Popeo, P.C.; Peter F. Corless

(57) ABSTRACT

An apparatus for preventing battery overcharge is provided and includes a plurality of holders interposed between cells stacked within a battery to enclose the cells in a stacking direction. An installation space is formed between outer parts of at least two holders that enclose the cells. In addition, a fluid pouch is disposed within the installation space and adjacent to the cells inside the installation space, and contains a fluid therein. A cutting part is disposed within the installation space and has a first end disposed adjacent to the fluid pouch, and has a cutter edge heading between a lead tab and a bus bar at a second end of the cutting part.

16 Claims, 7 Drawing Sheets

(56) References Cited

FOREIGN PATENT DOCUMENTS

| | | |
|---|---|---|
| JP | 2013-073930 A | 4/2013 |
| KR | 10-2009-0043717 A | 5/2009 |
| KR | 10-2009-0063839 | 6/2009 |
| KR | 10-1192077 | 5/2011 |
| KR | 10-1252981 | 2/2012 |
| KR | 10-2013-0030723 A | 3/2013 |
| KR | 10-2013-0044874 | 5/2013 |

* cited by examiner

APPARATUS FOR PREVENTING BATTERY OVERCHARGE

CROSS REFERENCE TO RELATED APPLICATION

This application claims the benefit of Korean Patent Application No. 10-2013-0157912, filed on Dec. 18, 2013, entitled "Apparatus for preventing over charging of battery", which is hereby incorporated by reference in its entirety into this application.

BACKGROUND

1. Technical Field

The present invention relates to an apparatus that prevents battery overcharge by detecting cell expansion even with a minimal amount of generated gas when a cell swells due to battery overcharge and accordingly disconnects a charging circuit to ensure the stability of a battery.

2. Description of the Related Art

Recently, as a solution for environmental pollution caused by fossil fuel, environmentally-friendly vehicles that utilize electricity as a main power source such as electric vehicles and hybrid vehicles is being developed. Environmentally-friendly vehicles require a battery to store electric energy, and especially a high-power and large-capacity battery to drive vehicles. Therefore, medium or large-sized batteries are usually employed. Since such medium or large-sized batteries are not easily mounted within vehicles due to their size and increase weight of vehicles, research into smaller batteries has been developed.

Recently, a battery structure employing a pouch meets the requirement and is drawing interest. Although batteries employing a pouch are advantageous in terms of electric efficiency, they have substantially low stability. Therefore, a technology is needed to obtain stability of the battery. In other words, in a battery employing a battery pack, when the battery is overcharged, voltage increases and overheat may occur, such that the battery cell swells due to gas generated therein. Accordingly, an overcharge safety apparatus is needed for high-voltage battery systems. The overcharge safety apparatus may protect a battery system from a fire by interrupting current flow to prevent thermal runaway when a battery is overcharged. In a passive type overcharge safety structure according to the prior art, expansion force occurring when a cell swells is utilized. When a cell swells sufficiently, cell expansion is caused by the opening of the end plate thus, breaking the cell tab part. Accordingly, current is interrupted and thus safety is ensured.

In the above structure, however, a cell must swell sufficiently before thermal runaway occurs. When a cell fails to swell sufficiently before thermal runaway, the apparatus operates with thermal runaway, and a fire may occur due to the thermal runaway even when current is interrupted. In addition, when the amount of the generated gas in a cell is insufficient, the cell tab part may not be broken.

As an alternative method for preventing battery overcharge, on the other hand, there is an active type technology that actively interrupts a relay. Such active type overcharge prevention structure includes sensors or switches to detect cell expansion and interrupts supplying power to a relay when cell expansion is detected and in turn current flow in a battery system. However, the technology to interrupt supplying power to a relay fails to interrupt current flow when the relay is fused. Additionally, the active type overcharge safety structure does not ensure safety when electric components such as sensors and switches fail in emergency situations such as accidents causing the components to not be operable. The matters described as the related art have been provided merely for facilitating the understanding of the background of the present invention and should not be construed as acknowledging them as the prior art already known to those skilled in the art.

SUMMARY

The present invention provides an apparatus that may prevent battery overcharge by detecting cell expansion even with a substantially small amount of generated gas when a cell swells due to battery overcharge and accordingly may disconnect a charging circuit to ensure the stability of a battery.

According to an exemplary embodiment of the present invention, an apparatus for preventing battery overcharge may include: a plurality of holders interposed between cells stacked within a battery to enclose the cells in a stacking direction; an installation space formed between outer parts of at least two holders enclosing the cells; a fluid pouch disposed within the installation space, and near (e.g., adjacent) to the cells within the installation space, and containing a fluid therein; and a cutting part disposed within the installation space, having an end (e.g., a first end) disposed adjacent to the fluid pouch, and having a cutter edge heading between a lead tab and a bus bar at the other end (e.g., a second end).

The holder may have a frame shape that surrounds a peripheral of a cell, the adjacent cells making surface contact through the holders. The installation space may be formed by assembling at least two holders that enclose cells to face each other. The fluid pouch may be pushed by expansion pressure when a cell swells to press the cutting part out. In addition, the fluid pouch may be slidable into and out of the installation space of the holder and may be disposed close to (e.g., adjacent to) the cells within the installation space to be fixed to the holders. The fluid pouch may include a fitting part disposed in a substantially center portion to divide internal space into inner space and outer space and may have a channel to allow a fluid to flow between the inner space and the outer space, and a cap part elastically installed into the fitting part to selectively open and close the channel.

The cap part of the fluid pouch may be elastically supported by an elastic part to block the channel, and elastic force of the elastic part may be less than expansion pressure when a cell swells. The fluid pouch may initially contain a fluid in the inner space and the movement of the fluid may be restricted by the elastically supported cap part, and the fluid in the inner space may push to open the cap part when a cell swells, and then to reach the outer space. The end of the fluid pouch facing the end of the cutting part may be folded several times to be rippled. Further, an extended portion that protrudes toward the inside of the installation space may be formed at the end of the cutting part. The lead tab and the bus bar may be bonded to each other through a plurality of welds spaced apart from one another. Additionally, cut protrusions that correspond to the welds may be formed at the cutter edge formed at the other end of the cutting part.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
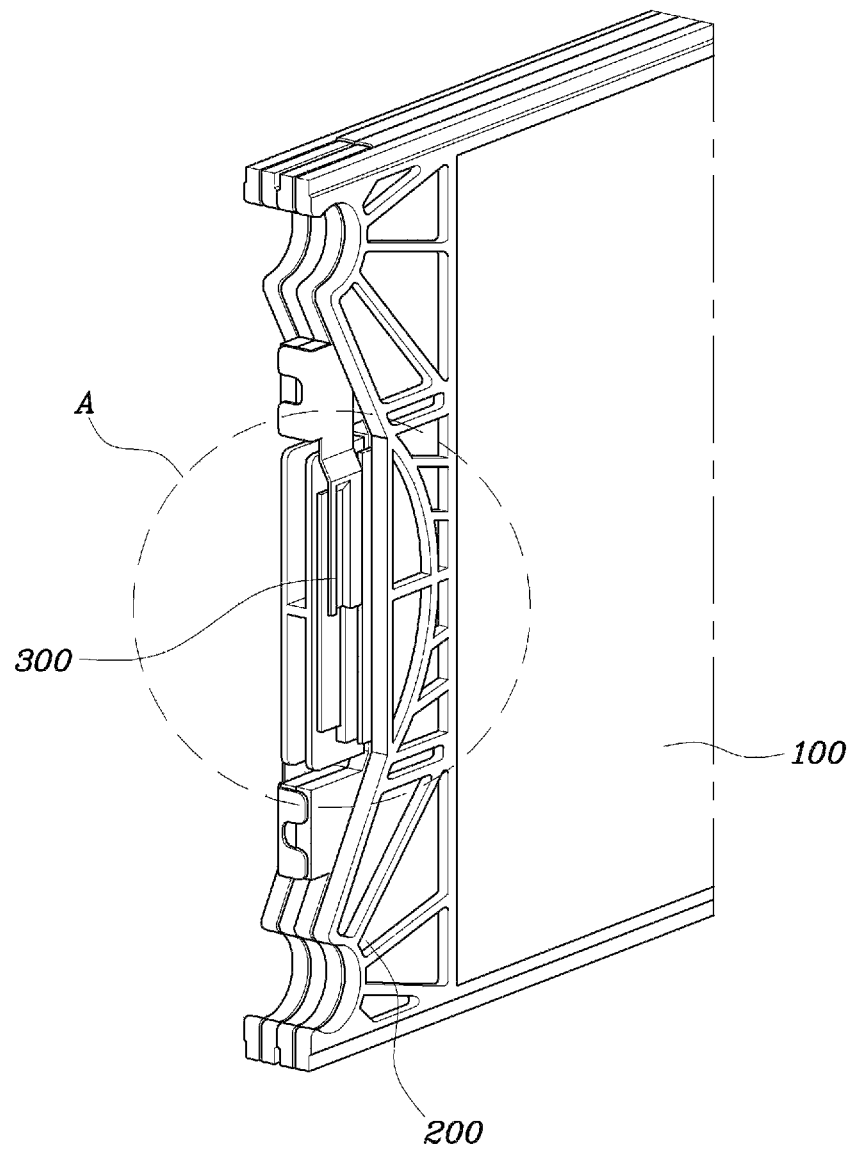
FIG. 1 is an exemplary view of an apparatus for preventing battery overcharge according to a first exemplary embodiment of the present invention.
Figure 2:
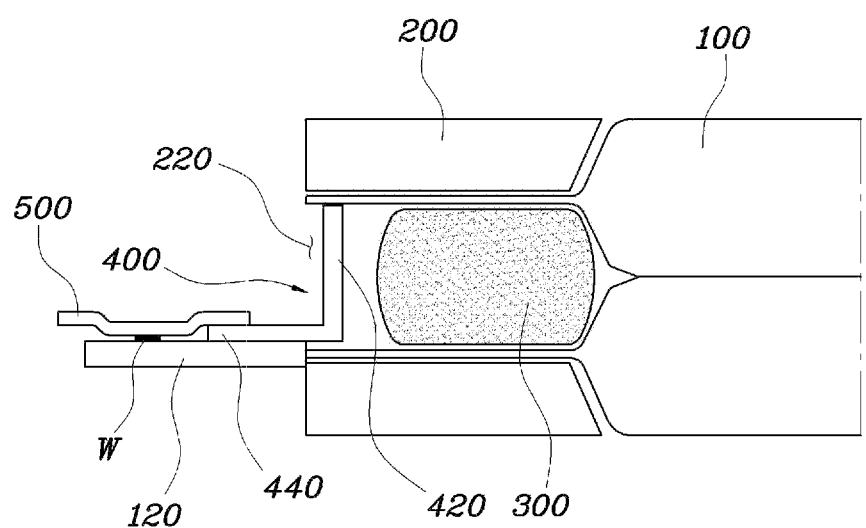
FIG. 2 is an exemplary cross-sectional view of portion A of the apparatus for preventing battery overcharge of FIG. 1 according to an exemplary embodiment of the present invention.
Figure 3:
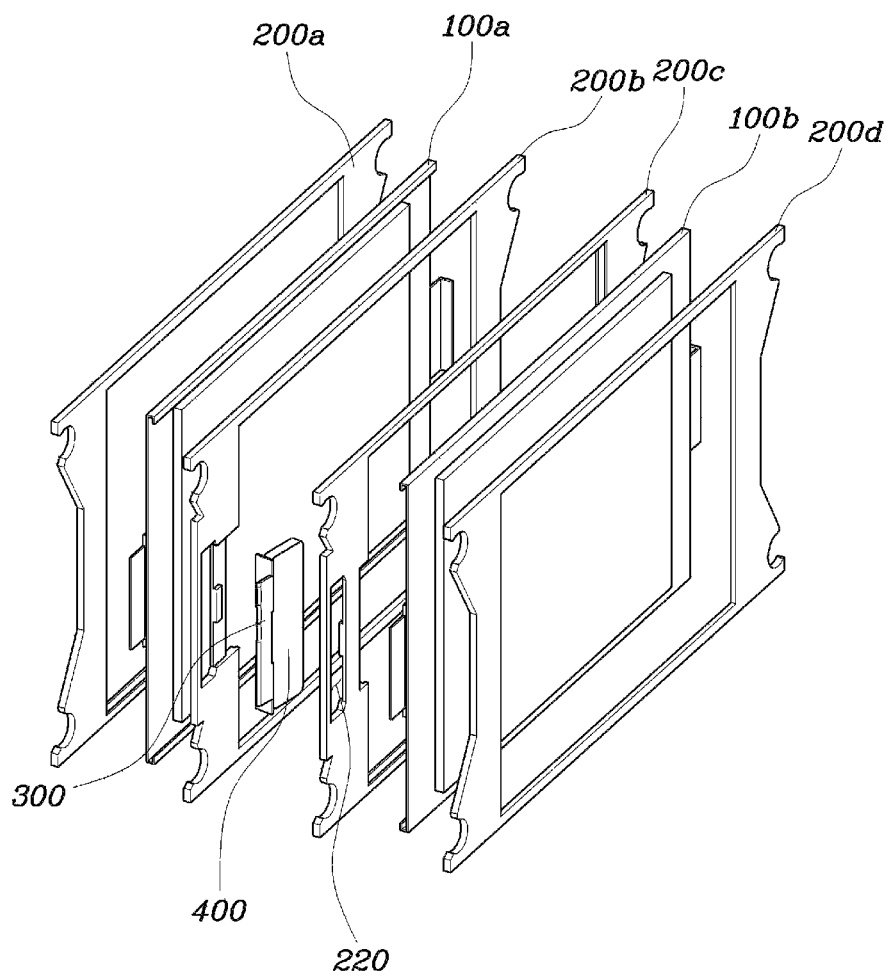
FIG. 3 is an exemplary detailed view of the apparatus for preventing battery overcharge of FIG. 1 according to an exemplary embodiment of the present invention.
Figure 4:
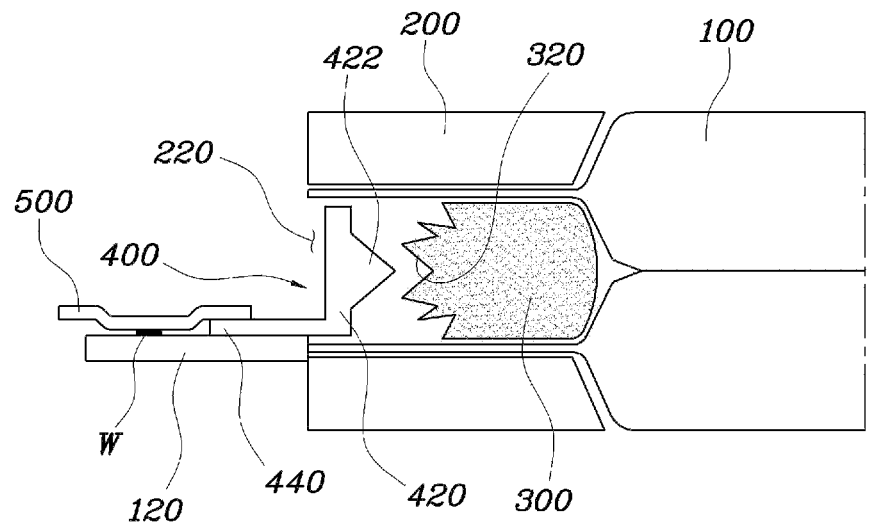
FIG. 4 is an exemplary cross-sectional view of an apparatus for preventing battery overcharge according to a second exemplary embodiment of the present invention.

Hereinafter, an apparatus for preventing battery overcharge according to an exemplary embodiment of the present invention will be described in detail with reference to the accompanying drawings. FIG. 1 is an exemplary view of an apparatus for preventing battery overcharge according to a first exemplary embodiment of the present invention; FIG. 2 is an exemplary cross-sectional view of portion A of the apparatus for preventing battery overcharge of FIG. 1, and FIG. 3 is an exemplary detailed view of the apparatus for preventing battery overcharge of FIG. 1.

An apparatus for preventing battery overcharge according to the present invention may include: a plurality of holders 200 interposed between cells 100 stacked on one another in a battery to cover the cells 100 in a stacking direction; an installation space 220 formed between outer parts of at least two holders 200 covering the cells 100; a fluid pouch 300 disposed within the installation space 220 adjacent to the cells 100 at an inside of the installation space 220 and containing a fluid therein; and a cutting part 400 disposed within the installation space 220, an end thereof 420 being disposed adjacent to the fluid pouch 300, a cutter edge 442 heading between a lead tab 120 and a bus bar 500 being formed at the other end thereof 440.

The present invention will be described in detail with reference to FIGS. 1 to 4. An apparatus for preventing battery overcharge according to the present invention may include a plurality of cells 100a and 100b stacked on one another within a battery with surface contact; a plurality of holders 200a, 200b, 200c and 200d interposed between the stacked cells 100a and 100b to cover the cells 100a and 100b; an installation space 220 formed between outer parts of the holder 200b and the holder 200c; a lead tab 120 extended from the cells 100 to be exposed through the installation space 220; a bus bar 500 electrically connected to a lead tab 120 via a weld.

In addition, the fluid pouch 300 and the cutting part 400 may be disposed within the installation space 220 to disconnect the lead tab 120 from the bus bar 500 when a cell swells. The fluid pouch 300 may be disposed within the installation space 220 adjacent to a cell 100, and may contain a fluid and thus, when a cell swells, the fluid may be moved and deformed by the swelling pressure of the cell 100 to push out the cutting part 400. The cutting part 400 may be disposed the installation space 220 with one end 420 (e.g., a first end) adjacent to the fluid pouch 300 and the cutter edge 442 heading between the lead tab 120 and the bus bar 500 may be formed at the other end 440 (e.g., a second end). When a cell swells, the fluid pouch 300 may be deformed and moved, to push the cutting part 400 out of the installation space 220, to cut and disconnect the lead tab 120 from the bus bar 500. In other words, when a cell swells, the cell 100 may expand out of the installation space 220, and then the fluid pouch 300 may be pushed by the expanded cell 100 to move and deform the expanded cell 100 out of the installation space 220. By the movement and deformation of the fluid pouch 300, the cutting part 400 may be pushed out to break between the lead tab 120 and the bus bar 500 and interrupt electric connection when the cell swells, thereby preventing the battery from being overcharged.

The holder 200 may have a frame shape that surrounds the edge of a cell 100. Adjacent cells 100 may contact a surface of the installation space 220 through the holder 200. The installation space 220 may be formed between at least two holders 200 surrounding a cell 100 that are assembled facing each other. In other words, the holder 200 may have a frame shape that surrounds the edge of a cell 100, and a hollow portion at a substantial center of the holder 200 to cause the adjacent cells 100a and 100b to make surface contact. In particular, the edges of cells 100 may be folded, and then the holder 200 may press the edges of the cells 100 with the edges of the cells 100 folded and assembled, to restrict the expansion toward an edge direction when a cell swells. In this manner, the cells 100 may be repeatedly stacked on one another, and pressed by end plates in a stacking direction at both sides, to restrict expansion toward a surface direction.

In addition, a bead may be formed where the installation space 220 at the outer part of the holder 200 is formed to reinforce the rigidity, to restrict a cell from swelling in the surface direction toward the portion where the installation space 220 is formed and thus the cell may expand toward the installation space 220. Accordingly, the movement of the fluid pouch 300 and the cutting part 400, which is to be described below, may be caused by the swelling caused by a substantially small amount of generated gas, to prevent heating due to overcharge.

The fluid pouch 300 may be pushed out by the expansion pressure when a cell swells and may press the cutting part 400 to push the cutting part 400 out of the installation space 220. That is, the fluid pouch 300 may slide into and out of the installation space 220 of the holder 200. In other words, the fluid pouch 300 and the cutting part 400 may be moved together by the expansion pressure of a cell when the cell swells. When the cell 100 expands, the fluid pouch 300 may be moved almost immediately, to interrupt a charging circuit when the cell swells.

As shown in FIG. 2, according to the present invention, the cutting part 400 and the fluid pouch 300 may be disposed within the installation space 220 of the holder 200. During the normal operation of the cells 100, that is, when the cells do not swell, the fluid pouch 300 located within the installation space 200 may not be deformed, and the cutting part 400 may not be moved within the installation space 200 of the holder 200 in contact therewith.

In particular, during the normal operation (e.g., when swelling of the cells does not occur), when a cell swells due to overcharge, the cell 100 may expand toward the installation space 220 since the expansion toward the surface direction is restricted, and the fluid pouch 300, which may be slidable within the installation space 220, may be pushed by the expansion pressure of the cell 100 to be moved toward the cutting part 400. Accordingly, the movement of the fluid pouch 300 may be converted into the operation force of the cutting part 400, to push the cutting part 400 out between the lead tab 120 and the bus bar 500, and the contact part between the lead tab 120 and the bus bar 500 may be cut by the cutter edge 442 and to disconnect the lead tab 120 from the bus bar 500. The fluid pouch 300 may be disposed adjacent to the cell 100 within the installation space 220 to be fixed to the holder 200.

Figure 5:
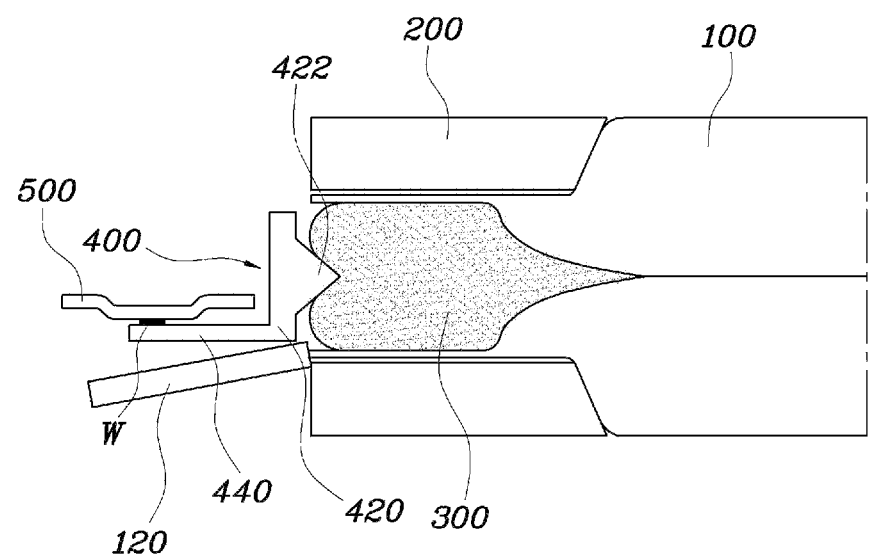
FIG. 5 is an exemplary diagram showing behavior of the apparatus for preventing battery overcharge according to the second exemplary embodiment of FIG. 4.

As described above, as shown in FIGS. 4 and 5, the location of the fluid pouch 300 may be fixed within the installation space 220 of the holder 200, to push the cutting part 400 out by deformation of the fluid pouch 300 when a cell swells. According to another exemplary embodiment, the end 320 of the fluid pouch 300 that faces the end 420 of the cutting part 400 may be folded several times so that it is rimpled. By folding the end 320 of the fluid pouch 300 facing the exterior of the installation space 220 several times, the volume of the fluid pouch 300 may change by the expansion pressure of a cell 100 when the cell swells, to cause the fluid contained in the fluid pouch 300 to move toward the exterior of the installation space 220 while pushing the cutting part 400. Further, by folding the end 320 (e.g., a first end) of the fluid pouch 300 closer to the cutting part 400 several times, the volume of the fluid pouch 300 may change when a cell swells, to cause the fluid contained in the fluid pouch 300 to smoothly move toward the exterior of the installation space 220. Accordingly, a charging circuit may be more smoothly interrupted when a cell swells.

Figure 6:
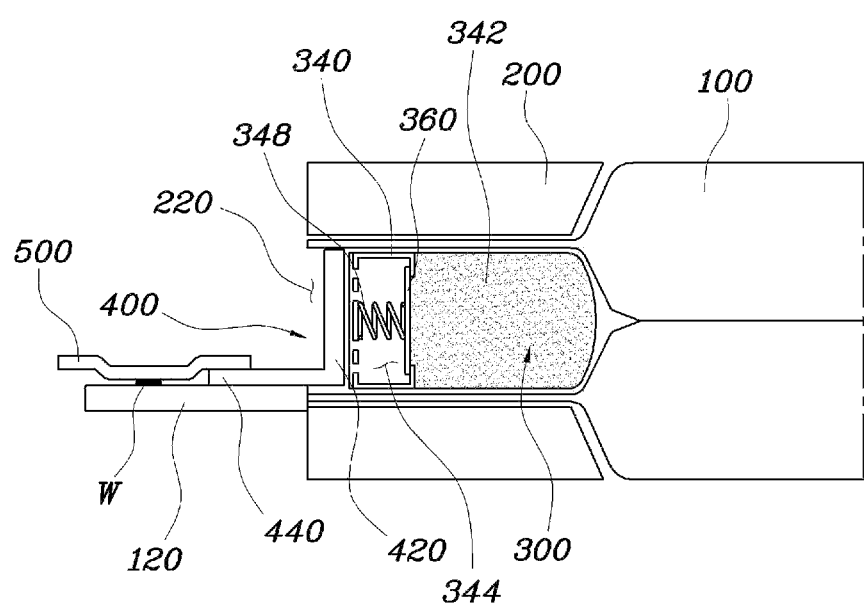
FIG. 6 is an exemplary cross-sectional view of an apparatus for preventing battery overcharge according to a third exemplary embodiment of the present invention.
Figure 7:
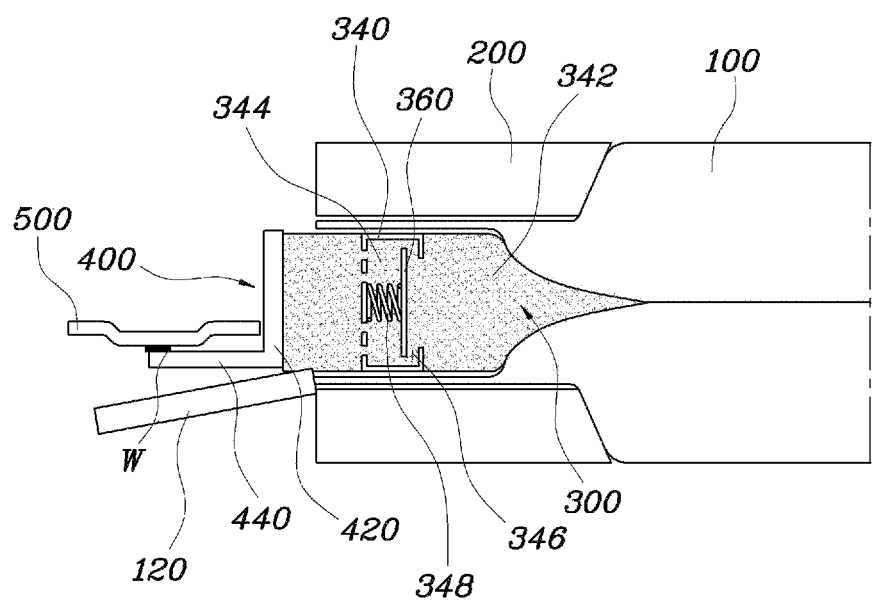
FIG. 7 is an exemplary diagram showing behavior of the apparatus for preventing battery overcharge according to the third exemplary embodiment of FIG. 6.
Figure 8:
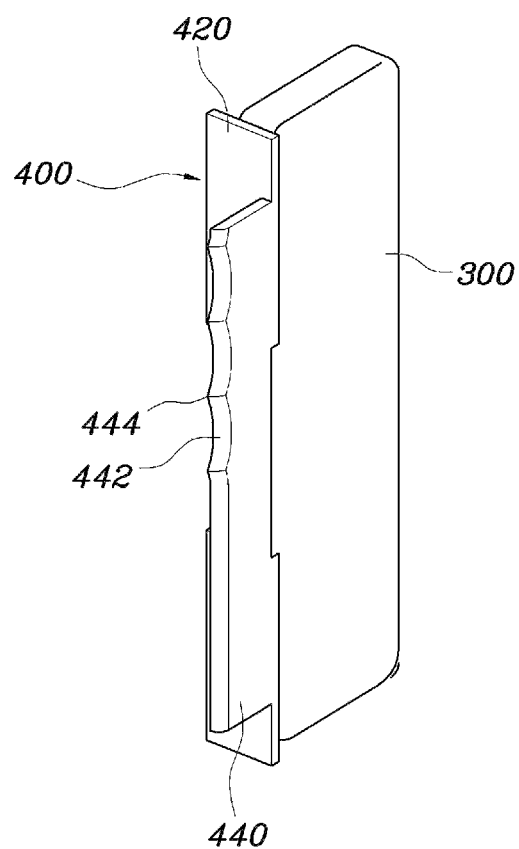
FIG. 8 is an exemplary diagram showing a cutting part in an apparatus for preventing battery overcharge according to an exemplary embodiment of the present invention.

Referring to FIGS. 6 and 7, the fluid pouch 300 may include a fitting part 340 disposed in the substantial center portion of the fluid pouch 300 to divide internal space of the fluid pouch 300 into an inner space 342 and an outer space 344 and may include a channel 346 to allow a fluid to flow between the inner space 342 and the outer space 344, and a cap part 360 elastically disposed within the fitting part 340 to selectively open and close the channel 346.

According to this exemplary embodiment, when a cell swells and the expansion pressure of the cell reaches a predetermined pressure, the fluid pouch 300 may expand and deform, and electricity may be interrupted by the cutting part 400. Specifically, the fitting part 340 may be disposed within the fluid pouch 300 to divide the internal space into the inner space 342 and the outer space 344, and the channel 346 may be formed to allow a fluid to flow between the inner space 342 and the outer space 344. The cap part 360 may be installed in the fitting part 340 to selectively close and open the channel 346. In particular, the cap part 360 may be elastically supported in the fitting part 340 to block the channel 346, to prevent a fluid from flowing between the inner space 342 and the outer space 344.

As shown in FIG. 6, during the initial state where the cells 100 are operating normally, the fluid pouch 300 may contain a fluid within the inner space 342, and the cap part 360 elastically supported may block the channel 346 of the fitting part 340 to restrict the movement of the fluid. Then, as shown in FIG. 7, when a cell swells, the cell 100 may expand to press against the fluid pouch 300, and the fluid within the inner space 342 may push the cap part 360 by the expansion pressure to open the channel 346, causing the fluid to move to the outer space 344 to thereby push out the cutting part 400. In particular, the cap part 360 of the fluid pouch 300 may be elastically supported by an elastic part 348 installed within the fitting part 340 to block the channel. The elastic force of the elastic part 348 may be less than the expansion pressure when a cell swells. In other words, by setting the elastic coefficient of the elastic part 348 less than the expansion pressure of the cell 100 when the cell 100 swells up to a dangerous level (e.g., a predetermined level), the cutting part 400 may be pushed out when the expansion pressure of the cell reaches an optimal level when the cell swells.

The fluid pouch 300 according to the third exemplary embodiment of the present invention has the advantage that the operation pressure of the overcharge safety structure may be adjusted by adjusting the elastic coefficient of the elastic part 348 based on the expansion pressure of the battery cell 100. At one end of the cutting part 400 (e.g., a first end), an extended portion 422 that protrudes toward the inside of the installation space 220 may be formed. By forming the extended portion 422 that protrudes toward the inside of the installation space 220 at the end 420 of the cutting part 400, the operation force from the fluid pouch 300 moved and deformed when a cell swells may be more easily transmitted. Accordingly, the movement of the fluid pouch 300 when a cell swells may be more smoothly converted into the operation force of the cutting part 400, to more smoothly cut the lead tab 120 from the bus bar 500.

Incidentally, the lead tab 120 and the bus bar 500 may be bonded via a plurality of welds W spaced apart from one another. At the cutter edge 442 formed at the other end 440 (e.g., a second end) of the cutting part 400, a plurality of cut protrusions 444 may be formed to correspond to the welds. As such, the lead tab 120 and the bus bar 500 may be bonded to each other via the plurality of welds W spaced apart from one another, and the cut protrusions 444 that correspond to the welds may be formed at the cutter edge 442 of the cutting part 400, to reduce the resistance during the cutting between the lead tab 120 and the bus bar 500 with the cutter edge 442 of the cutting part 400. Accordingly, the welds may be more easily broken.

The apparatus for preventing battery overcharge thus configured may obtain improved battery stability by more accurately detecting cell expansion even with a substantially small amount of generated gas and accordingly disconnecting a charging circuit when a cell swells due to overcharge.

In particular, unlike existing apparatuses for preventing battery overcharge that require increased or substantial space to obtain package space in which a cell may expand toward the surface direction, the apparatus for preventing battery overcharge according to the present invention may reduce package space to allow compact module design, and accordingly energy density per volume of a battery system may be increased. Moreover, with reduced volume of the module, the volume of the overall pack may also be reduced, and thus the size of the structure in the pack may also be decreased. Therefore, the aluminum covers between cells, which are included in existing module design, may be eliminated to save the cover mold cost and material costs.

Although the present invention has been described with reference to particular exemplary embodiments, it will be obvious to one skilled in the art that various changes and modifications can be made to the present invention without departing from the scope of the present invention defined by the accompanying claim.

What is claimed is:

1. An apparatus for preventing battery overcharge, comprising:
    a plurality of holders each interposed between cells stacked within a battery to enclose the cells in a stacking direction;
    an installation space formed between outer parts of at least two holders that enclose the cells;
    a fluid pouch disposed within the installation space and adjacent to the cells inside the installation space, and containing a fluid therein; and
    a cutting part disposed within the installation space, having a first end disposed adjacent to the fluid pouch, and having a cutter edge heading between a lead tab and a bus bar at a second end of the cutting part,
    wherein swelling of the cells causes the cutting part to be pressed and pushed out from the installation space by the fluid pouch due to expansion pressure generated by the cells,
    wherein the fluid pouch is disposed adjacent to the cells within the installation space to be fixed to the holders, and
    wherein the fluid pouch includes:
        a fitting part disposed in a substantially center portion to divide an internal space of the fluid pouch into an inner space and an outer space and has a channel to allow a fluid to flow between the inner space and the outer space; and
        a cap part elastically disposed in the fitting part to selectively open and close the channel.

2. The apparatus of claim 1, wherein the holder has a frame shape that surrounds a peripheral of a cell, the adjacent cells making surface contact via the holders.

3. The apparatus of claim 1, wherein the installation space is formed by assembling at least two holders that enclose cells to face each other.

4. The apparatus of claim 1, wherein the fluid pouch is slidable into and out of the installation space of the holder.

5. The apparatus of claim 1, wherein the cap part of the fluid pouch is elastically supported by an elastic part to block the channel and elastic force of the elastic part is less than the expansion pressure when a cell swells.

6. The apparatus of claim 1, wherein the fluid pouch initially contains a fluid in the inner space and the movement of the fluid is restricted by the elastically supported cap part, and the fluid in the inner space pushes to open the cap part when a cell swells, to reach the outer space.

7. An apparatus for preventing battery overcharge, comprising:
    a plurality of holders each interposed between cells stacked within a battery to enclose the cells in a stacking direction;
    an installation space formed between outer parts of at least two holders that enclose the cells;
    a fluid pouch disposed within the installation space and adjacent to the cells inside the installation space, and containing a fluid therein; and
    a cutting part disposed within the installation space, having a first end disposed adjacent to the fluid pouch, and having a cutter edge heading between a lead tab and a bus bar at a second end of the cutting part,
    wherein swelling of the cells causes the cutting part to be pressed and pushed out from the installation space by the fluid pouch due to expansion pressure generated by the cells,
    wherein the fluid pouch is disposed adjacent to the cells within the installation space to be fixed to the holders, and
    wherein an end of the fluid pouch that faces the first end of the cutting part is folded several times to be wrinkled.

8. The apparatus of claim 1, wherein an extended portion that protrudes toward the inside of the installation space is formed at the first end of the cutting part.

9. The apparatus of claim 1, wherein the lead tab and the bus bar are bonded to each other through a plurality of welds spaced apart from each another.

10. The apparatus of claim 9, wherein a plurality of cut protrusions that correspond to the welds are formed at the cutter edge formed at the second end of the cutting part.

11. The apparatus of claim 7, wherein the holder has a frame shape that surrounds a peripheral of a cell, the adjacent cells making surface contact via the holders.

12. The apparatus of claim 7, wherein the installation space is formed by assembling at least two holders that enclose cells to face each other.

13. The apparatus of claim 7, wherein the fluid pouch is slidable into and out of the installation space of the holder.

14. The apparatus of claim 7, wherein an extended portion that protrudes toward the inside of the installation space is formed at the first end of the cutting part.

15. The apparatus of claim 7, wherein the lead tab and the bus bar are bonded to each other through a plurality of welds spaced apart from each another.

16. The apparatus of claim 15, wherein a plurality of cut portions that correspond to the welds are formed at the cutter edge formed at the second end of the cutting part.

* * * * *